Aug. 17, 1926.
G. C. WHITNEY
1,596,220
RAILWAY TRAFFIC CONTROLLING SYSTEM
Original Filed March 5, 1924
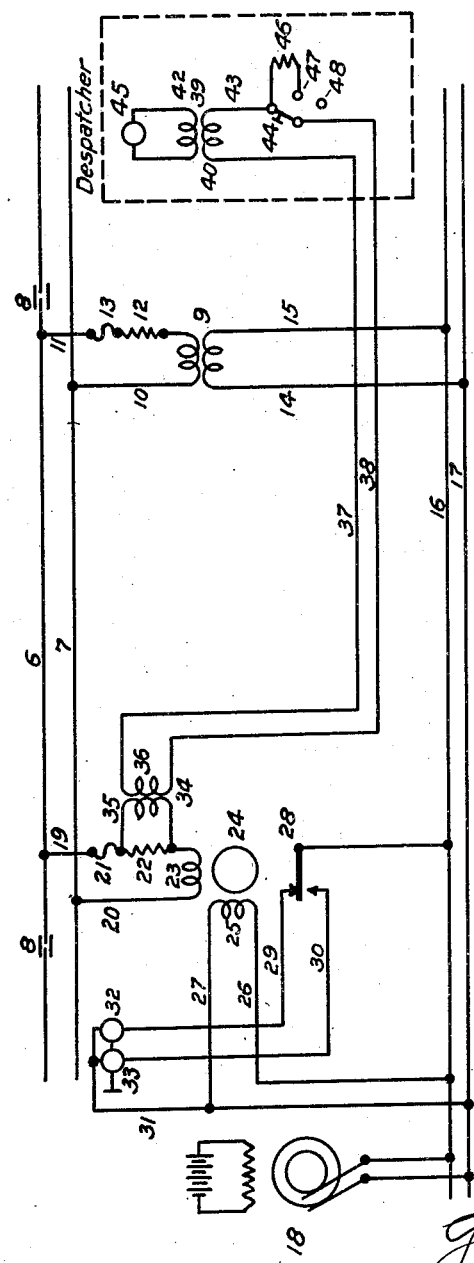
INVENTOR
Gilbert C Whitney Patented Aug. 17, 1926.

1,596,220

UNITED STATES PATENT OFFICE.

GILBERT C. WHITNEY, OF NEW YORK, N. Y.

RAILWAY-TRAFFIC-CONTROLLING SYSTEM.

Original application filed March 5, 1924, Serial No. 697,129. Divided and this application filed September 3, 1924. Serial No. 735,584.

This invention relates to railway traffic controlling systems in general wherein means are provided for the control of trains by signals and in particular to means for controlling said signals by the novel means of controlling the track relay of the track circuit from a remote location and retaining indication as to its operation.

This present application is a division of my co-pending application filed March 5, 1924, Serial No. 697,129 for railway traffic controlling system.

The accompanying drawing is a view showing one form of railway traffic controlling apparatus having incorporated therewith one form of control which characterizes my invention.

Referring to the drawing, a track section is set apart by insulated joints 8 the track rails of the section being identified by the reference characters 6 and 7. At one end of said track section a transformer 9 is shown connected to rails 6, 7, by means of track wires 10, 11, resistance 12 and fuse 13. Transformer 9 is the medium, when energized via wires 14, 15, from power wires 16, 17, connected to the source of energy, alternator 18, by which appropriate current supply, when a train is not present, is transmitted over said track rails to track wires 19, 20 fuse 21 and resistance 22 to winding 23 of relay 24. Winding 25 of relay 24 receives energy via wires 26, 27, from power wires 16, 17, and thus far the whole constitutes the well-known alternating track circuit wherein most of the energy required for the operation of the track relay 24 is supplied locally and only a small part or activating current is transmitted over the track rails. Also in conventional manner I have shown signal 32—33 controlled by contact 28 of relay 24 and control wires 29, 30 and 31. The track and circuit and signal and circuit outlined above is intended simply as a structure and I make no claims of invention in connection therewith.

My invention consists in connecting the winding 35 of transformer 34 in series in the track circuit (here shown in multiple with resistance 22) so that a part of the current flowing to winding 23 of relay 24 passes through said winding 35. Inductively coupled to winding 35 is shown winding 36 and the current induced therein is carried over transmission wires 37, 38, to the despatchers' quarters and there energizes winding 40 of transformer 39 via wire 43 and despatchers multiple point control switch 44. Inductively coupled to winding 40 is shown winding 42 and the current induced therein becomes available and is used for energizing indicator lamp 45. From the above it will be clear that when the track section is not occupied it will be indicated by the fact of lamp 45 being lighted and that when the track section is occupied lamp 45 will not be receiving sufficient energy to cause the same degree of illumination (because most of the current in the track rails will pass through the train wheel shunt) and therefore, lamp 45 indicates the condition, with respect to occupancy and non-occupancy, of the track section.

Associated with control switch 44 I have shown a resistance 46 which I use to provide despatcher's control of signal 32—33 and at the same time retain track section indication. To control signal 32—33 the despatcher moves switch 44 out of engagement as shown and into position to contact 47—this inserts resistance 46 into the transmission circuit included with wires 37, 38, and less current flows therein resulting in lower induced current supply to lamp 45. As a result of increasing the resistance of the transmission circuit the impedance of winding 36 is increased which automatically is reflected in increased impedance in winding 35 and as this winding is in series in the circuit supplying current to winding 23 a lowered current supply to winding 23 of relay 24 is effected and the relay opens and with the opening of the relay contact 28 a change in the indication of signal 32—33 results as will be appreciated.

Important features of this invention are that the despatcher's control of the signal is introduced at the relay end of the track circuit and therefore does not interfere with whatever use may be desired to be made of the track circuit energy from the transformer 9 end of the track section by a train on the track rails 6, 7. Also that track section indication as to non-occupancy is evidenced by a lighted indicator lamp.

Obviously, various types of track circuits, both alternating and direct current, of single and double rail types may be employed in combination with my invention by making the obvious appropriate changes well-known to any one ordinarily skilled in this art and I desire to have it understood, therefore, that the foregoing illustration and description does not exhaust the various embodiments and forms which my invention may take in practice.

Having thus described my invention I claim and desire to secure by Letters Patent:

1. In a railway traffic controlling system, a track circuit including a relay and a source of energy, a block signal and system controlled by said track relay, a second signal and indication system inductively coupled to said track circuit and receiving operating energy therefrom when the track circuit is not occupied by a train and with reduced operating energy when the track circuit is occupied by a train, said systems acting independently of each other.

2. The invention set forth in claim 1 with a remotely located despatcher's control means included in the inductively coupled system for controlling the block signal system by control of the current received from the track rails.

3. In a railway traffic controlling system, a track circuit including a winding of a two winding relay and a source of energy, the other winding of said relay receiving energy direct from said source, the primary winding of a transformer included in series in the relay connection to the track rails of the track circuit, the secondary winding of said transformer included in a circuit containing a despatcher's control switch.

4. The invention set forth in claim 3 with an indicating device inductively coupled with the circuit containing the despatcher's control switch.

5. The invention set forth in claim 3 with an indicating device inductively coupled with the circuit containing the despatcher's control switch and adapted to indicate when the track circuit is not occupied by a train.

6. The invention set forth in claim 3 with an indicating device inductively coupled with the circuit containing the despatcher's control switch and adapted to indicate when the track circuit is not occupied by a train, said indicating device also adapted to indicate reduced energy supply to the track relay when the track circuit is not occupied by a train and the despatcher's control switch has been operated, said track relay controlling an automatic block signal system for governing train movements over said track circuit.

7. In a railway traffic controlling system, an alternating current track circuit including a source of energy and one winding of a two winding track relay, said source of energy applied to the track circuit at one end of an insulated track rail section and said winding connected to the insulated track rail section at the other end, the other winding receiving energy direct from said source, and an indicator lamp connected in series with the first mentioned winding between said winding and said insulated track rail section.

8. In a railway traffic controlling system, an alternating current track circuit including a source of energy and a track relay, said source of energy applied to the track circuit at one end of an insulated track rail section and the relay connected to the insulated track rail section at the other end, and means including an indicator lamp inductively coupled in series with the track relay connection to track rails.

9. The invention set forth in claim 7 with said indicator lamp inductively coupled to the track circuit between said winding and said insulated track rail section.

10. The invention set forth in claim 7 with said indicator lamp inductively coupled to the track circuit between said winding and said insulated track rail section, said track relay controlling an automatic block signal system for governing train movements over said track circuit.

Signed at New York in the county of New York and State of New York this 2nd day of September, A. D. 1924.

GILBERT C. WHITNEY.